United States Patent

Dower et al.

[11] Patent Number: 6,151,433
[45] Date of Patent: Nov. 21, 2000

[54] OPTICAL FIBER CONNECTOR USING PHOTOCURABLE ADHESIVE

[75] Inventors: William V. Dower, Austin, Tex.; Joel D. Oxman, Minneapolis; Brian N. Holmes, St. Paul, both of Minn.

[73] Assignee: 3M Innovative Properties Company, St. Paul, Minn.

[21] Appl. No.: 09/085,198

[22] Filed: May 27, 1998

Related U.S. Application Data

[63] Continuation-in-part of application No. 09/017,966, Feb. 3, 1998, Pat. No. 6,085,004.

[51] Int. Cl.[7] .................................................. G02B 6/30
[52] U.S. Cl. ................................ 385/86; 385/80; 385/84
[58] Field of Search .................................. 385/147, 80, 84, 385/78, 60, 66, 86; 359/900

[56] References Cited

U.S. PATENT DOCUMENTS

| | | | |
|---|---|---|---|
| 3,729,313 | 4/1973 | Smith | 96/27 R |
| 3,741,769 | 6/1973 | Smith | 96/35.1 |
| 3,808,006 | 4/1974 | Smith | 96/88 |
| 4,028,162 | 6/1977 | Cherin et al. | 156/158 |
| 4,045,121 | 8/1977 | Clark | 350/96 C |
| 4,077,702 | 3/1978 | Kunze et al. | 350/96.21 |
| 4,148,559 | 4/1979 | Gauthier | 350/96.21 |
| 4,218,113 | 8/1980 | Uberbacher | 350/96.21 |
| 4,250,053 | 2/1981 | Smith | 252/426 |
| 4,322,127 | 3/1982 | Comerford et al. | 350/96.21 |
| 4,394,403 | 7/1983 | Smith | 427/42 |
| 4,553,814 | 11/1985 | Bahl et al. | 350/96.21 |
| 4,642,126 | 2/1987 | Zador et al. | 51/295 |
| 4,652,274 | 3/1987 | Boettcher et al. | 51/298 |
| 4,699,462 | 10/1987 | Jones | 350/96.23 |
| 4,767,180 | 8/1988 | Zajac et al. | 350/96.21 |
| 4,984,865 | 1/1991 | Lee et al. | 350/96.2 |
| 5,024,363 | 6/1991 | Suda et al. | 225/96.005 |
| 5,048,908 | 9/1991 | Blonder et al. | 385/39 |
| 5,058,984 | 10/1991 | Bulman et al. | 385/80 |
| 5,080,461 | 1/1992 | Pimpinella | 385/65 |
| 5,151,964 | 9/1992 | Carpenter et al. | 385/98 |
| 5,381,498 | 1/1995 | Bylander et al. | 385/83 |
| 5,381,504 | 1/1995 | Novack et al. | 385/128 |
| 5,525,648 | 6/1996 | Aasen et al. | 523/116 |
| 5,539,849 | 7/1996 | Petisce | 385/102 |
| 5,545,676 | 8/1996 | Palazzotto et al. | 522/15 |
| 5,757,997 | 5/1998 | Birrell et al. | 385/60 |

FOREIGN PATENT DOCUMENTS

2660442  10/1991  France .......................... G02B 6/36

Primary Examiner—Hung N. Ngo
Attorney, Agent, or Firm—John A. Fortkort

[57] ABSTRACT

A fiber optic connector including a holder for one ore more optical cables, each optical cable having an optical fiber surrounded by strengthening fibers, both of which are surrounded by at least one polymeric coating layer. The cable is stripped in a layerwise manner such that an area of exposed fiber is succeeded by an area of exposed strengthening fibers, succeeded by an area of coated cable. A visible light curable adhesive is injected into the holder and cured by exposure to visible light for up to about 30 seconds, bonding the optical fiber layers and the holder into a unified structure.

46 Claims, 2 Drawing Sheets

Fig. 1

OPTICAL FIBER CONNECTOR USING PHOTOCURABLE ADHESIVE

This application is a continuation in part of Ser. No. 09/017,966 filed Feb. 3, 1998 now U.S. Pat. No. 6,085,004.

BACKGROUND OF THE INVENTION

1. Field of the Invention

The invention relates to an optical fiber connector and the use of radiation in the visible portion of the spectrum to cure a photocurable adhesive in an optical fiber connector to bond the optical fiber, the reinforcing fibers and the optical holder into a unified structure, in order to provide an improved connection between two optical fibers or an optical fiber and an optoelectronic component.

2. Description of the Art

Optical fibers have replaced copper wire as the preferred medium for carrying telecommunications signals. As with copper wire, it is necessary to provide for the interconnection of optical fibers during installation, repair or replacement of the fibers, and to terminate the fibers onto active optical devices. There are generally two kinds of interconnection devices, splices and connectors. The term "splice" usually refers to a device, which provides a permanent connection between a pair of optical fibers. The term "connector," in contrast, usually refers to a device, which may be engaged and disengaged repeatedly, often with a different plug or receptacle. A connector may also refer to the plug portion of a fiber termination, which is attached to an optical device. Optical devices include, for example, optical sensors (photoelectric diodes) and light sources (LED's, laser diodes). The termination of an optical fiber may be indirect, i.e., the fiber may be connected to some other (passive) optical device such as a beam splitter or polarizer, before the light beam is directed to the active optical device. The present invention is generally directed to a connector, although this term should not be construed in a limiting sense since the present invention may inherently provide a permanent, as well as temporary connection or termination.

In the fiber optic connector described in U.S. Pat. No. 5,381,498, the connector has a plug and a receptacle, the plug having a fiber-receiving, V-shaped groove for each fiber to be interconnected, with the end of the fiber terminating in the middle of the groove. The receptacle has a plate which retracts as the plug is inserted, whereby another fiber is lowered into the V-groove of the plug. Upon full insertion of the plug, the two fiber ends are in contact, and the fiber secured to the receptacle is elastically deformed to maintain a continuous compressive load between the terminal ends of the fibers. The connector provides for the quick disconnection and reconnection of a plurality of optical fiber pairs, without the use of ferrules or other alignment members. High strength fiber may be used to withstand repeated insertions and bowing of the fibers. The exact lengths of fibers (i.e., the relative locations of their terminal ends in the plug and receptacle) are not critical since tolerance is provided by the slack taken up in the bowed receptacle fiber (the terminal portion of the fiber secured to the plug does not bow, but always remains straight). The ends of the fibers may be prepared by simply cleaving and beveling; the end faces may optionally be cleaved at an angle (i.e., non-orthogonal to the fiber axis) to reduce signal reflections.

Many fiber optic splices employ plate elements having fiber-receiving grooves, with mechanisms for clamping the terminal ends of the fibers in a common groove. Some of these devices are designed to interconnect a plurality of pairs of fibers, such as the splice shown in U.S. Pat. No. 5,151,964. In U.S. Pat. No. 4,028,162, fibers approach alignment grooves at a glancing angle and are held temporarily while a connector plate is adhered to the interconnected fibers. For other examples of techniques involving bowed fibers entering alignment grooves, see U.S. Pat. Nos. 4,077,702, 4,148,559, 4,322,127 and 5,080,461, and French Pat. Application No. 2,660,442. Some of the connector designs using the principle of bowing a fiber into a fiber-alignment groove are rather complex and require many parts, such as the designs seen in U.S. Pat. Nos. 4,045,121, 4,218,113 and 4,767,180.

In order to provide a termination or interconnection with the required strength without damaging the system, the fibers must be secured to the connector body to inhibit or at least reduce the relative movement between the optical fiber and its outer sleeve.

Such an attachment system may be mechanical, such as a clamp or set of clamps or it may be a type of adhesive. A mechanical system may also include strength members such as layers of stranded steel wire, as disclosed in U.S. Pat. No. 5,539,849.

Useful adhesives for termination must be capable of bonding to the outer surface of the fiber, which may be formed from materials such as glass, epoxy silicones, and the like. It also must be capable of bonding to other materials used in fiber optic cables and their terminations, such as polymeric coating layers, and strengthening fibers used to surround the optical fibers, and plastics from which the holder is formed. The strengthening fibers are typically aromatic polyamide fibers derived from p-phenylenediamine and terephthaloyl chloride, available commercially as Nomex® or Kevlar®.

U.S. Pat. No. 4,699,462 discloses a method for forming a termination between a fiber optic cable having a centrally positioned optical fiber, a plurality of surrounding reinforcements, and a component housing. An adhesive, preferably a heat activated adhesive, is applied within the termination and heat shrink tubing is applied in order to force the reinforcement fibers into adhesive engagement with the adhesive layer. Bond formation occurs primarily at the interface between the cladding on the optical fiber core, and reinforcement strands. The adhesive does not provide bonding to the heat shrink tubing; it is present to provide reinforcement to the termination.

U.S. Pat. No. 5,058,984 discloses a fiber optic cable connector comprising a plastic outer sleeve to be optically coupled to another optical fiber cable, carrying at one end, connection means for coupling, a tubular gripping member which adheres the fiber to the outer sleeve or holder, which is deformed by application of force so as to grip the end portion of the plastic outer sleeve and a ferrule mounted within the other end of the connector body supporting an exposed end portion of an optical fiber. The optical fiber is adhered to the ferrule with adhesive material. The ferrule is ceramic and the exposed end of the fiber is set with a light curable resin, generally blue light where the ferrule is formed of zirconia. This allows a setting time to be reduced to about 60 seconds. It is specifically disclosed that an irradiation curable adhesive might not adhere sufficiently strongly to the plastics outer sleeve; therefore the adhesive material is used to secure the end portion within the ferrule, and does not need to provide any adhesive to the plastic outer sleeve.

As can be seen, even with the use of adhesives, conventional fiber optic connector assemblies have required the use of additional positioning or bonding means in order to resist disruptive force. It would be very desirable to eliminate such means and be able to provide a unified system wherein the bond is formed solely from an adhesive which adheres the optical fiber to the outer holder of the connector, and adheres to the fiber as well as the coating and strengthening fibers without requiring additional positioning means such as heat shrink tubing, gripping members and the like.

U.S. Pat. No. 5,525,648 discloses a treatment method for application to dentin and cervical enamel or adhering to hard tissue in a high humidity environment. Primer compositions disclosed bond strongly to dentin, and exhibit high shear strength, and include an acid and a film former, which are applied and then hardened. A wide variety of acids are useful, including organic, inorganic, solid and liquid acids. Useful film formers are water dispersible and may be selected from many polymers, monomers and mixtures. After standing time to achieve priming, the primer, optionally, with an additional layer of film former is then hardened by use of a polymerization catalyst.

U.S. Pat. No. 5,545,676 discloses a three component or ternary photoinitiator system for use in additional polymerization. A variety of acrylate monomers are disclosed. The system is disclosed to provide a combination of cure speed, cure depth and shelf life, and is disclosed to be useful in color profiling systems, curable inks, printing plates, photoresists, coated abrasives, photocurable adhesives and composites, e.g., for dentistry or autobody repair.

The present invention provides a fiber optic connector using a visible light photocurable adhesive composition to bond the optical fiber(s), the strengthening fibers surrounding the fiber and a coating layer thereover into a unified structure. The system provides a fast cure, good depth of cure, and a safe, low energy means for providing the bond, which can be easily accomplished by a tradesperson.

SUMMARY OF THE INVENTION

The invention provides an optical fiber connector comprising an optical fiber, and a termination or interconnection bonded in place solely by means of a visible light photocurable adhesive.

Specifically, the invention provides a fiber optic connector including
  a) at least one fiber optic cable comprising at least one optical fiber surrounded by a plurality of strengthening fibers, both of which are surrounded by at least one polymeric coating layer, a portion of said cable being stripped in a layerwise manner such that an area of exposed fiber is succeeded by an area of exposed strengthening fibers, succeeded by an area of coated cable;
  b) a holder for the optical cable, and
  c) a visible light curable adhesive injected into the holder, the optical fiber, the strengthening fibers and the holder being bonded into a unified structure by means of exposure to visible light for a period of up to about 30 seconds.

Preferably, the adhesive comprises at least one acrylate monomer. The adhesive is curable by visible radiation having a wavelength between about 400 and about 700 nanometers; preferably from about 400 to about 600 nanometers, which includes a portion of the blue and the green area of the spectrum, most preferably between about 500 and about 600 nanometers. Curing time is less than about 30 seconds, preferably less than about 25 seconds. The adhesive bonds strongly to the fiber, coating and holder to form a unified structure, such that the structure is not easily disrupted when force is applied to the connector, or to the strengthening fibers.

In an alternate embodiment, the adhesive is a photocurable adhesive which is curable by exposure to radiation having wavelengths of from about 700 nm to about 1100 nm, in the near-infrared region.

Preferred optical fiber connector assemblies of the invention comprise an adhesive having a ternary photoinitiator system comprising an electron donor, a sensitizer and a diaryliodonium salt.

The invention also provides a method of bonding interconnections or terminations in optical fiber connectors and cables wherein the termination or interconnection is bonded in place solely by means of a visible light photocurable adhesive.

As used herein, these terms have the following meanings.

1. The term "visible light" means electromagnetic radiation having wavelengths between about 400 nm and about 700 nm.

2. The term "near-infrared", abbreviated "nIR", means electromagnetic radiation having wavelengths between about 700 nm and about 1000 nm.

3. The term "plug" means an article, which is present in a connector, for retaining and selectively aligning the first optical fiber in a connector. Plugs are insertable into the receptacle to form a connection or termination.

4. The term "receptacle" means an article present in a connector, for retaining and selectively aligning the second optical fiber in a connection.

5. The term "holder" means that portion of the plug which holds the first optical fiber in place.

6. The term "connector" means an article for forcing the end of a first optical fiber towards an end of a second optical fiber in contact in the end of the first optical fiber. A connector includes a plug and a receptacle.

7. The term "unified structure" as used herein refers to the condition wherein components, including the optical fiber, plurality of reinforcing fibers and the holder are joined in a bonded, fixed relationship held together by photocurable adhesive that has been exposed to actinic radiation of suitable wavelength for adhesive polymerization.

8. The terms "termination" and "connection" mean the point at which a first optical fiber is forced into contact with either a second optical fiber or an optoelectronic device.

9. The term "(meth)acrylate" includes both the acrylate and the methacrylate.

10. The term "GGP" fiber refers to a glass fiber ocverconated concentrically with successive layers of glass cladding and polymeric, frequently epoxy silicone coating layers.

As used herein, all parts, percents, and ratios are by weight, unless specifically stated otherwise.

BRIEF DESCRIPTION OF THE DRAWINGS

The invention will best be understood by reference to the accompanying drawings, wherein.

DETAILED DESCRIPTION OF THE INVENTION

Optical fiber assemblies of the invention comprise at least one optical fiber in a holder, adhered to the holder by means of a photocurable adhesive. While previous systems using adhesives have required other positioning devices such as heat shrinkable tubing, "gripping members" and the like, the assemblies of the invention develop a strong bond between the adhesive and the various portions of the connector such as the holder, the fiber optical cable coating, the strengthening members and the optical fiber, forming a unified structure.

Adhesive systems useful in assemblies of the invention are photocurable in the visible area of the spectrum, and can be applied as one or two part adhesives. The adhesives may be provided already in the fiber assembly, or they may be provided separately, in syringe-like applicators, to enable application in the field.

A wide variety of monomers can be photopolymerized to form the connection or termination in the connector of the invention.

Suitable monomers contain at least one ethylenically-unsaturated double bond, and are capable of undergoing addition polymerization. The molecular weight may vary, and the "monomers" discussed may include oligomers.

One preferred monomer is formed by combining a dimethacrylate derived from the reaction methacrylic acid and the diglycidyl ether of bisphenol A (BISGMA) with a hydrophilic monomer such as hydroxypropyl methacrylate, hydroxyethyl methacrylate (HEMA), or methacrylic acid. Such monomers include mono-, di-, or poly(meth)acrylates such as methyl (meth)acrylate, ethyl (meth)acrylate, isopropyl (meth)acrylate, n-hexyl (meth)acrylate, stearyl (meth) acrylate, allyl (meth)acrylate, glycerol di(meth)acrylate, glycerol tri(meth)acrylate ethylene glycol di(meth)acrylate, diethyleneglycol di(meth)acrylate, triethyleneglycol di(meth)acrylate, diethyleneglycol di(meth)acrylate, triethyleneglycol dimethacrylate, 1,3-propanediol di(meth) acrylate, trimethylolpropane tri(meth)acrylate, 1,2,4-butanetriol tri(meth)acrylate, 1,4-cyclohexanediol diacrylate, pentaerythritol tetramethacrylate, sorbitol hexa(meth)acrylate, bis-1-(2-acryloxy)]-p-ethyoxyphenyldimethyl methane, bis[1-(3-acryloxy-2-hydroxy)]-p-propoxyphenyldimethylmethane, trihydroxyethyl-isocyanurate tri(meth)acrylate; the bis-acrylates and bis-methacrylates of polyethylene glycols having molecular weights between about 200 and about 500; copolymerizable mixtures of acrylate monomers such as those disclosed in U.S. Pat. No. 4,652,274, and acrylated oligomers such as those disclosed in U.S. Pat. 4,642,126, both of which are incorporated herein by reference; unsaturated amides such as methylene bis-acrylamide, methylene bis-methacrylamide, 1,6-hexamethylene bis-acrylamide, diethylene triamine tris-acrylamide and beta-methyacrylaminoethyl methacrylate, and vinyl compounds such as styrene, diallyl phthalate, divinyl succinate, divinyl adipate and divinylphthalate. The adhesive may contain only one type of monomer or mixtures of two or more monomers may be used.

The photoinitiator system is one, which is capable of light absorption in the visible range, i.e., between about 400 nm and about 700 nm. In preferred assemblies of the invention, the photoinitiator absorbs light between about 400 nm and about 600 nm, more preferably between 500 nm to about 600 nm, in the green and a portion of the blue portion of the spectrum. Components in the photoinitiator system include at least one initiator and at least one sensitizer.

Useful sensitizers should be soluble in the monomer and are capable of light absorption in the appropriate wavelengths. The sensitizer is also preferably capable of sensitizing 2-methyl-4,5-bis(trichloromethyl)-s-triazine, according to the test procedure described in U.S. Pat. No. 3,729,313, incorporated herein by reference. Preferably, the sensitizer is also shelf stable for reasonable periods of time.

Suitable sensitizers are believed to include compounds in the following categories: ketones, coumarin dyes (e.g., keto-coumarins), xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriaryl methanes, merocyanines, squarylium dyes and pyridinium dyes. Ketones (e.g., monoketones or alpha-diketones), ketocoumarins, aminoarylketones and p-substituted aminostyryl ketone compounds are preferred sensitizers. For applications requiring high sensitivity, it is preferred to employ a sensitizer containing a julolidinyl moiety. For applications requiring deep cure (e.g., where the coating or strengthening fibers attenuate radiation of similar wavelengths), it is preferred to employ sensitizers having an extinction coefficient below about 1000, more preferably below about 100, at the desired wavelength of irradiation for photopolymerization.

By way of example, a preferred class of ketone sensitizers has the formula:

$$ACO(X)_bB$$

where X is CO or $CR^1R^2$, where $R^1$ and $R^2$ can be the same or different, and can be hydrogen, alkyl, alkaryl or aralkyl, b is one or zero, and A and B can be the same or different and can be substituted (having one or more non-interfering substituents) or unsubstituted aryl, alkyl, alkaryl, or aralkyl groups, or together A and B can form a cyclic structure which can be a substituted or unsubstituted cycloaliphatic, aromatic heteroaromatic or fused aromatic ring.

Suitable ketones of the above formula include monoketones (b=0) such as 2,2-, 4,4- or 2,4-dihydroxybenzophenone, di-2-pyridyl ketone, di-2-furanyl ketone, di-2-thiophenyl ketone, benzoin, fluorones, quinones, e.g., chloroquinone, 2-aza-3-carboxy-9-fluorone, and the like, chalcone, Michler's ketone, 2-fluoro-9-fluorone, 2-chlorothioxanthone, acetophenone, benzophenone, 1- or 2-acetonaphthone, 9-acetylantracene, 2-, 3- or 9-acetylphenanthrene, 4-acetylbiphenyl, propiophenone, n-butyrophenone, valerophenone, 2-, 3- or 4-acetylpyridine, 3-acetylcoumarin and the like. Suitable diketones include aralkyldiketones such as anthraquinone, phenanthrenequinone, o-, m- and p-diacetylbenzene, 1,3-, 1,4-, 1,5-, 1,6-, 1,7- and 1,8-diacetylnaphthalene, 1,5-, 1,8- and 9,10-diacetylanthracene, and the like. Suitable α-diketones (b=1 and X=CO) include 2,3-butanedione, 2,3-pentanedione, 2,3-hexanedione, 3,4-hexanedione, 2,3-heptanedione, 3,4-heptanedione, 2,3-octanedione, 4,5-octanedione, benzil, 2,2'-, 3,3'- and 4,4'-dihydroxylbenzil, furil, di-3,3'-indolylethanedione, 2,3-bornanedione (camphorquinone), 1,2-cyclohexanedione, 1,2-naphthaquinone, acenaphthaquinone, and the like.

Other preferred sensitizers include Rose Bengale, Fluorescein, Eosin Yellow, Eosin Y, Ethyl Eosin, Eosin Bluish, Erythrosin Yellowish Blend, 4',5'-Dibromofluorescein.

The photoinitiator system also includes an electron donor. A wide variety of donors can be used; the donor should be soluble in the monomer, and have good shelf stability. Suitable donors are capable of increasing the speed of cure or depth of cure of a composition upon exposure to light of the desired wavelength. The donor has an oxidation potential greater than zero, and less than or equal to the oxidation potential of p-dimethoxybenzene. Preferable the oxidation potential is between about 0.5 and 1 volts vs. A saturated calomel electrode (S.C.E.). Values may be measured experimentally or obtained from references such as N. L. Weinburg, Ed., *Technique of Electroorganic Synthesis Part II Techniques of Chemistry*, Vol. V (1975) and the like.

Preferred donors include amines (including aminoaldehydes and aminosilanes), amides (including phosphoramides), ethers (including thioether), ureas (including thioureas), ferrocene, sulfinic acids and their salts, salts of ferrocyanide, ascorbic acid and its salts, dithiocarbamic acid and its salts, salts of xanthates, salts of ethylene diamine tetraacetic acid, and salts of tetraphenylboronic acid. The donor can be unsubstituted or substituted with one or more non-interfering substituents. Particularly preferred donors contain an electron donor atom such as a nitrogen, oxygen, phosphorus, or sulfur atom, and an abstractable hydrogen atom bonded to a carbon or silicon atom alpha to the electron donor atom.

Preferred amine donor compounds include alkyl-, aryl-, alkaryl- and aralkyl-amines such as methylamine, ethylamine, propylamine, butylamine, triethanolamine, amylamine, hexylamine, 2,4-dimethylaniline, 2,3-dimethylaniline, o-, m- and p-toluidine, benzylamine, aminopyridine, N,N'-dimethylethylenediamine, N,N'-diethylethylenediamine, N,N'-dibenzylethylenediamine, N,N'-diethyl-1,3-propanediamine, N,N'-diethyl-2-butene-1, 4-diamine, N,N'-dimethyl-1,6-hexanediamine, piperazine, 4,4'-trimethylenedipiperidine, 4,4'-ethylenedipiperidine, p-N,N-dimethyl-aminophenethanol and p-N-dimethylaminobenzonitrile; aminoaldehydes such as p-N,N-dimethylaminobenzaldehyde, p-N,N-diethylaminobenzaldehyde, 9-julolidine carboxaldehyde and 4-morpholinobenzaldehyde; and aminosilanes such as trimethylsilylmorpholine, trimethylsilylpiperidine, bis (dimethylamino)diphenylsilane, tris(dimethylamino) methylsilane, N,N-diethylaminotrimethylsilane, tris (dimethylamino)phenylsilane, tris(methylsilyl)amine, tris (dimethylsilyl)amine, bis(dimethylsilyl)amine, N,N-bis (dimethylsilyl)aniline, N-phenyl-N-dimethylsilylaniline and N,N-dimethyl-N-dimethysilylamine. Tertiary aromatic alkylamines, particularly those having at least one electron-withdrawing group on the aromatic ring, have been found to provide especially good shelf stability. Good shelf stability has also been obtained using amines that are solids at room temperature.

Preferred amide donor compounds include N,N-dimethylacetamide, N,N-diethylacetamide, N-methyl-N-phenylacetamide, hexamethylphosphoramide, hexaethylphosphoramide, hexapropylphosphoramide, trimorpholinophosphine oxide and tripiperidinophosphine oxide.

Suitable ether donor compounds include 4,4'-dimethoxybiphenyl, 1,2,4-trimethoxybenzene and 1,2,4,5-tetramethoxybenzene.

Suitable urea donor compounds include N,N'-dimethylurea, N,N-dimethylurea, N',N'-diphenylurea, tetramethylthiourea, tetraethylthiourea, tetra-n-butylthiourea, N,N-di-n-butylthiourea, N,N'-di-n-butylthiourea, N,N-diphenylthiourea and N,N'-diphenyl-N,N'-diethylthiourea.

In one embodiment of the invention, the photoinitiator system is a ternary system, according to U.S. Pat. No. 5,545,676, incorporated herein by reference. In such a three component system, the additional component is a diaryliodonium or sulfonium salt. The salt should also be soluble in the monomer and be shelf stable when dissolved therein in the presence of the sensitizer and donor. Accordingly an election of a particular iodonium or sulfonium salt may depend to some extent on the monomers selected, and the other portions of the photoinitiator system. Such ternary system must contain these three parts; however, it may contain more than one sensitizer or electron donor, if desired.

Useful salts are those disclosed in U.S. Pat. Nos. 3,729, 313, 3,741,769, 3,808,006, 4,250,053, and 4,394,403, the iodonium salt portions of the disclosures of which are incorporated herein by reference.

Preferred iodonium salts include diphenyliodonium chloride, diphenyliodonium hexafluorophosphate and diphenyliodonium tetrafluorborate.

Useful sulfonium complex salts are substituted with at least one, and preferably three, aromatic groups. Representative groups are aromatic groups having 4 to 20 carbon atoms and are selected from phenyl, thienyl and furanyl groups. These aromatic groups may optionally have one or more fused benzo rings (e.g., naphthyl and the like; benzothienyl, dibenzothienyl; benzofuranyl, dibenzofuranyl; etc.). Such aromatic groups may also be substituted, if desired, by one or more of the following groups, or by other groups which are essentially non-reactive with other components present in the particular composition in which the complex salt is to be used: halogen, nitro, aryl, ester groups, sulfoester groups, amido groups, carbamyl groups, sulfamyl groups, alkoxy groups, aryl groups, alkyl groups, aryloxy groups alkylsulfonyl groups, arylsulfonyl, perfluoroalkyl groups, and perfluoroalkylsulfonyl groups.

Examples of suitable aromatic sulfonium complex salt photoinitiators include: triphenylsulfonium tetrafluoroborate, methyldiphenylsulfonium tetrafluoroborate dimethylphenylsulfonium hexafluorophosphate triphenylsulfonium hexafluorophosphate, triphenylsulfonium hexafluoroantimonate, 4-butoxyphenyldiphenylsulfonium tetrafluoroborate, 4-chlorophenyldiphenylsulfonium hexafluoroantimonate, tris(4-phenoxyphenyl)sulfonium hexafluorophosphate, di(4-ethoxyphenyl)methylsulfonium hexafluoroarsenate, 4-acetamidophenyldiphenylsulfonium tetrafluoroborate dimethylnaphthylsulfonium hexafluorophosphate, trifluoromethyldiphenylsulfonium tetrafluoroborate, methyl(N-methylphenothiazinyl) sulfonium hexafluoroantimonate phenylmethylbenzylsulfonium hexafluorophosphate, 10-methylphenoxathiinium hexafluorophosphate, 5-methylthianthrenium hexafluorophosphate, 10-phenyl-9,9-dimethylthioxanthenium hexafluorophosphate, 10-phenyl-9-oxothioxanthenium tetrafluoroborate, 5-methyl-10,10-ioxothianthrenium hexafluorophosphate.

The preferred salts are the triaryl-substituted salts such as triphenylsulfonium hexafluorophosphate. The triaryl-substituted salts are preferred because they are more thermally stable than the mono- and diaryl substituted salts and accordingly may be used in one-part curable systems where long shelf life is desired. The triaryl-substituted complex salts are also more amenable to dye sensitization in accordance with this invention.

Figure 1:
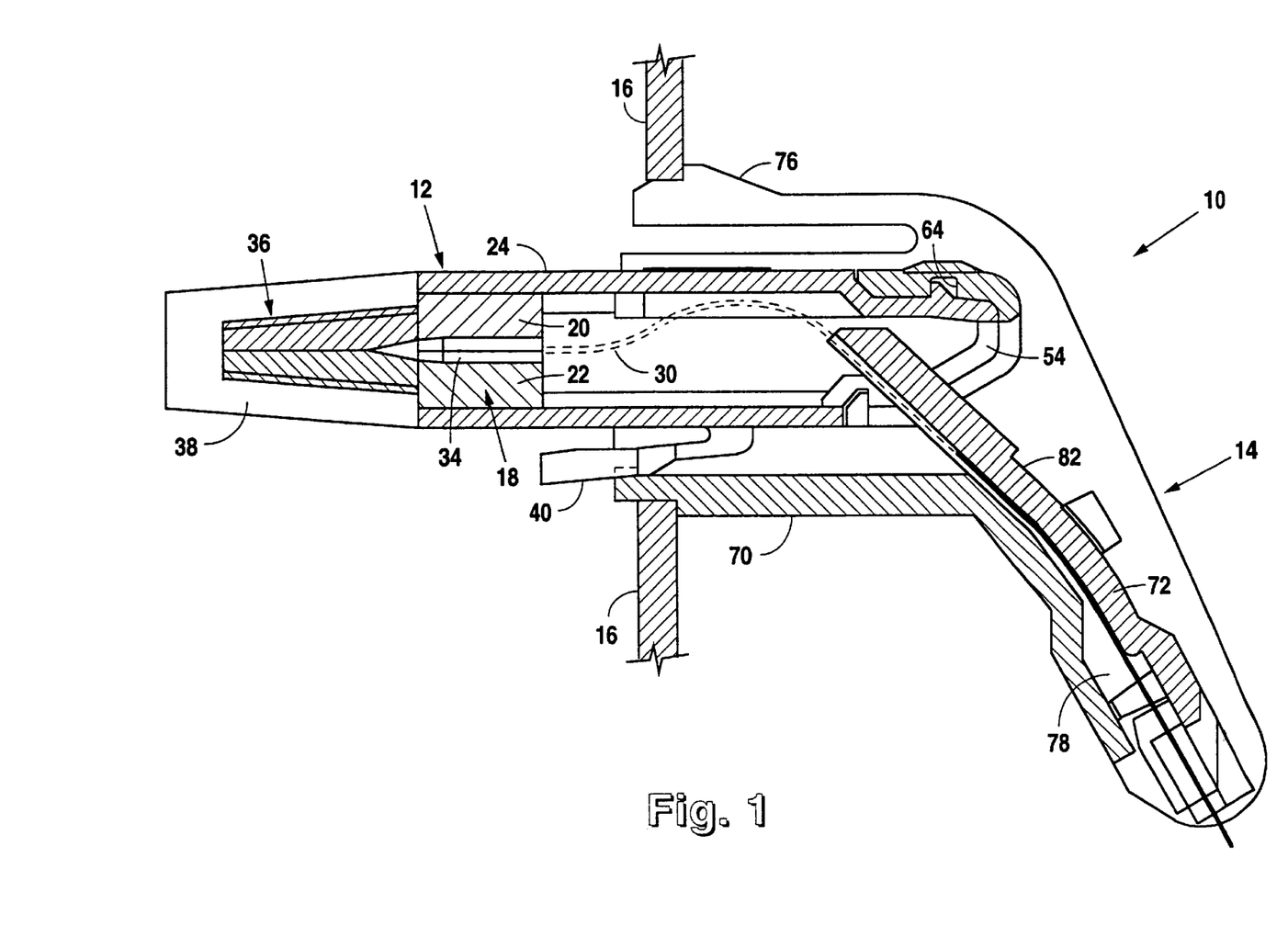
FIG. 1 is a side view of a longitudinal section of one embodiment of the present invention, depicting a fiber optic connector including a plug and receptacle.
Figure 2:
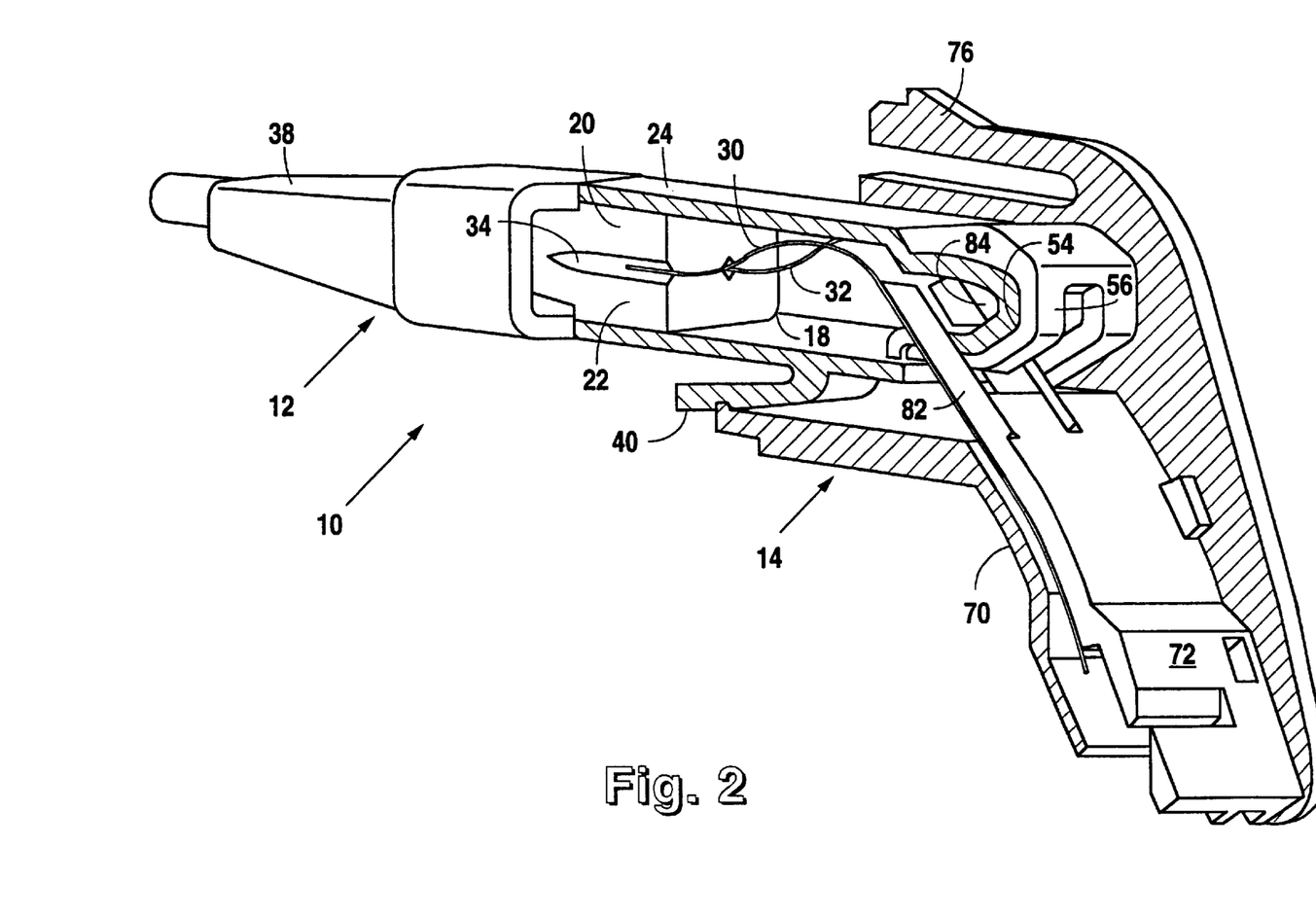
FIG. 2 is a perspective view of the plug and receptacle of FIG. 1, with a partial section revealing the bowed fibers in the plug interior.

The adhesive of the present invention may be used with a variety of different connector designs. FIGS. 1 and 2 illustrate one embodiment 10 of a fiber optic connector in accordance with the present invention. The connector 10 is comprised of an elongate plug 12 and a socket or receptacle 14. FIG. 1 is a longitudinal section of connector 10 showing plug 12 fully inserted in receptacle 14, and receptacle 14 mounted on a support surface or bulkhead 16. FIG. 2 is a perspective view with bulkhead 16 omitted, also with a partial longitudinal section to illustrate the interior of the connector. The depicted embodiment provides for the interconnection of two pairs of fibers, but those skilled in the art will appreciate that the inventive concepts described herein extend to single pair interconnection as well as interconnection of a multiplicity of pairs.

The plug 12 includes a fiber holder 18 which may be constructed of two clamping elements or blocks 20 and 22, and a plug body or shroud 24 which is attached to fiber holder 18. Optical fibers 30 and 32 which are to be interconnected or terminated pass through holder 18 and into the hollow interior of shroud 24. The terminal portions of the fibers are bare, that is, they are not affixed to any alignment member such as a ferrule. The shroud 24 therefore serves not only to assist in physically locating plug 12 in receptacle 14, but also to provide protection for the otherwise exposed terminal portions of the fibers (the shroud could be made retractable to fully expose the fiber tips, if required). The holder 18 has fiber-receiving grooves 34 formed in the adjacent surfaces of blocks 20 and 22; these two components may be identical parts.

The optical fibers are secured to holder 18 by use of the adhesive heretofore described. The adhesive is injected through holes in the connector for that purpose, and cured. The adhesive should adhere to the cable coating, which is typically epoxy silicone, polyolefin or polyvinylchloride, where such is still present as well as the strengthening fibers, e.g., Kevlar®, in those areas where the outer coating has been stripped away, to an inner polymeric layer, which is likewise typically epoxy silicone, polyolefin or polyvinylchloride, and finally to the fiber itself to hold the fiber in position.

The holder 18 may have an extension 36 surrounding the fibers for additional strain relief and clamping. A boot 38 may be provided for further strain relief and capturing of the strengthening fibers in the fiber cable (KEVLAR® strands), and to assist in handling plug 12. The strengthening fibers need not be crimped, but they may be adhered into the unified structure of the holder by means of the same adhesive as used to secure the fiber to the holder, as described supra. Strain relief of the strengthening members is attained by a force fit of straightwall section of the optical fiber holder within the boot 38. This is dependent upon the choice of materials used for the boot 38 and the optical fiber holder 18, and yields a design that does not require a crimp ring and which assists in ease of manufacture and reduces the number of needed components. "One-way" barbs on the surface of the optical fiber holder assist in the attachment of the boot 38 to the optical fiber holder 18, which also assists in the attachment of the cable to the plug 12.

A latch 40 is integrally molded onto one side of shroud 24 to releasably secure plug 12 to receptacle 14. The latch 40 may also impart mechanical polarization to the plug, that is, it may be inserted into receptacle 14 only in one orientation. Plug 12 may be biased in the interconnected position, e.g., by a springboard (a flexible cantilever) formed inside receptacle 14, to be pushed back against latch 40 to minimize the effect of manufacturing tolerances.

The receptacle 14 includes a body or housing 70 and another fiber holder 72. The housing 70 may also have appropriate features (such as latch arms 76) allowing it to be releasably mounted to bulkhead 16 which may be, for example, a patch panel or workstation outlet (wall box faceplate). The latch mechanism may provide for mounting from the front of the panel, to allow all preparatory work to be done at the front side of the panel, or may provide for mounting from the rear of the panel, to allow all preparatory work to be done at the back side of the panel. Additional mechanisms may be provided, such as the fiber hold-down, to retain the fibers firmly in the grooves. The fibers do not extend to the very tips of fingers 82 and 84 but rather terminate a sufficient distance from the tips to allow proper support of the portion of the optical fibers in the plug when the connector is in use. If the fiber-to-fiber contact occurs very near the tips of the V-grooves (or if the plug is inserted too far), the fiber portion in the plug can bend beyond the groove and lifted away from the apex, breaking the connection.

The receptacle 14 may have as many of these fingers with fiber-alignment grooves as there are fibers in plug 12. Fingers 82 and 84 are shaped to project into slots 54 and 56, respectively, of shroud 24 when plug 12 is fully inserted into receptacle 14. Fingers 82 and 84 enter shroud 24 at an oblique (nonzero) angle with respect the plug axis, i.e., the axis defined by either of the optical fibers 30 or 32 when they are extending straight within shroud 24. This angle is preferably about 42°, which balances concerns regarding fiber end face contact pressure, fiber forces directed into the V-groove, the effects of friction, and the desired tolerance window (a larger angle increases tolerances). Since the receptacle fibers are not directed toward opening 74, there is no danger of escaping light injuring a user's eyes. Receptacle fiber holder 72 is pivotally attached to housing 70 by providing posts on the first end of holder 72 which snap into cutouts or hooks 88 formed at one end of receptacle housing 70. The holder 72 releasably locks into place using bumps or studs formed on the side of the holder, which engage holes 89 in receptacle housing 70. An alternative design for the receptacle fiber holder may be used in which the holder is molded as a single piece with a breakaway top or cover plate that can snap onto its base, the base having the fiber-positioning grooves.

All of the components of connector 10 (except plug boot 38) may be formed of any durable visable light or infrared radiation transmitting material, preferably an injection moldable polymer such as polycarbonate, VALOX (a polyester sold by General Electric), or RADEL (a polyarylsulfone sold by Amoco). The material may include conductive fillers to render the components semiconductive in order to minimize triboelectric charging which can induce fiber end contamination, so long as such fillers do not unduly attenuate the radiation during curing. The boot 38 is preferably formed of low modulus copolyester elastomer, such as that available from RTP of Winona, Minn., under material number 1559X67420B.

Assembly and installation of connector 10 is straightforward. Plug 12 is typically assembled in the factory, although it may easily be assembled in the field. To place the adhesive into the assembly, simply place adhesive into a syringe like applicator (if desirable, the adhesive may be provided in such an applicator), over the opening in the holder and inject the adhesive into the holder 18. The adhesive is then cured by placing a light having the required wavelength radiation above the connector for a period of 25 seconds to a few minutes. Useful lights include the Model XL3000, available from 3M, which uses a 75 Watt tungsten source, either unfiltered or filtered to pass blue light.

It is also understood that plug 12 or receptacle 14 could be mounted on a jumper cable or patch cord with any kind of optical connector at the other end of the fibers. It is recommended that fibers be used which have a longer life when exposed to indoor environments, such as the high-strength fibers available from Minnesota Mining and Manufacturing Co. Those fibers have a conventional core and cladding which is surrounded by a novel three-layer construction, as discussed in U.S. Pat. No. 5,381,504, disclosed herein by reference. Those skilled in the art will also appreciate that the connector of the present invention can accommodate discrete optical fibers or multifiber ribbons, as well as both single-mode and multi-mode fibers.

Fibers which are to be pre-terminated to either plug 12 or receptacle 14 should be stripped, cleaved and cleaned. If the fibers are in the form of a ribbon which is part of a bundled group of ribbons in a cable, then a portion of the cable jacket must first be cut back to reveal the ribbons. Most cables have several protective layers, and each of these layers must be removed to provide access to the fiber ribbons. Similar steps must be taken to remove the protective layers of a cable having a single discrete fiber. After the fibers have been removed from the protective cable jacket, they are stripped. The stripped fibers are then ready for cleaving which may be accomplished using any one of several commercially available fiber cleavers, such as that shown in U.S. Pat. No. 5,024,363. The cleave length for attachment of the fibers to plug 12 is the distance from fiber holder 18 which, in the preferred embodiment, is about 23 mm. For attachment of fibers to receptacle 14, the cleave length is the distance from fiber holder 72 which, in the preferred embodiment, is about 15 mm.

Once the craftsperson is satisfied that each of the fibers has an acceptable end face, the fibers may be removed from the cleaver. The fibers may further optionally be provided with an asymmetric treatment, like cleaving so as to impart an angled end face, as taught in U.S. Pat. No. 5,048,908. For the plug, fiber preparation may be done after the fiber cable has been threaded through boot 38.

Final assembly of plug 12 comprises the simple steps of placing the fibers in the V-grooves of holder 18 and snapping shroud 24 onto holder 18. An assembly fixture may be used to guide shroud 24 onto the fiber holder so as to avoid damaging the fibers as they are inserted into the shroud. The ends of the fibers should terminate in the plug about 0.5 mm from the end of the shroud. Completion of receptacle 14 is also simple. Fiber holder 72 is attached to housing 70, first by pushing the pivot posts into cutouts 88, and then snapping the studs into holes 89. Care should be taken during placement of the fibers in the V-grooves and attachment of the holder to the receptacle to not contaminate the fiber tips.

Installation of connector 10 is equally straightforward. Receptacle 14 is optionally mounted to any desired surface by convenient means, such as latching arms 76 (other constructions could be molded into housing 70 for custom mounting). Several receptacles could also be mounted in a single module, and they can be designed for front or rear loading, or sliding from the side. After receptacle 14 is mounted, the connection is completed by simply inserting plug 12 into opening 74. Plug 12 is released from receptacle 14 by latch 40.

The dimensions of the various components of connector 10 may vary considerably depending upon the desired application. The following approximate dimensions are considered exemplary. Plug 12 has an overall length of 57 mm, a width of 12 mm, and a thickness of 8 mm, and fiber holder 18 provides clamping grooves that are 13 mm long. Plug shroud 24 extends 25 mm beyond holder 18, providing an interior space which is 24 mm long, 10 mm wide and 6 mm high. Opening 74 of receptacle 14 is 12 mm×10 mm. Its overall height and depth are 38 mm and 36 mm. Receptacle fiber holder 72 is 20 mm long (from the end where the fibers are clamped to the tips of fingers 82 and 84), 12 mm wide and 1.5 mm thick. The fiber-alignment grooves in fingers 82 and 84 are 11.5 mm long and have a maximum depth of 2 mm which suitably accommodates most conventional optical fibers. The interior angle of the V-grooves should not be too narrow since this might result in excess friction with the fibers, but it also should not be too wide since this would not keep the fibers guided properly. A 90° interior angle is believed to be a good compromise.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. Variations are possible in the plug, receptacle and holder. For detailed discussion of the mechanical construction of a useful connector, see U.S. Pat. 5,381,498, and copending U.S. Ser. Nos. 08/577,740, and 08/801,058, all of which are incorporated herein by reference. For example, although only two fiber pairs are shown connected in the figures, connector 10 could accommodate practically any number of fibers (or just a single pair). It is therefore contemplated that such modifications can be made without departing from the spirit or scope of the present invention as defined in the appended claims.

Test Methods

Kevlar® Pull Test

Cables were inserted into the plug with no Kevlar® fanout. The jacket was placed about 0.010 cm behind the rear injection ports. The adhesive was injected by hand using a 3 cc syringe, being sure that the cavity was completely filled.

Each plug was then cured with two 5 second exposures, one on the top and one on the bottom with the appropriate light sources (Dymax adhesive UV, or visible with blue filter, adhesive of the invention with white light).

Each cable was cut in half and split until two independent cables protruded from the plug. For the Kevlar® pulls, the plug was placed into a fixture that was attached to a chattillon DFM100 scale. One at a time, the cables consisting of jacket, Kevlar®, and GGP fiber, were wrapped around a 6.25 cm diameter mandrel and clamped into place. They were pulled at a rate of 1.25 cm per minute until failure.

Fiber Pull Test

For three fiber pulls, after the plug was placed into the fixture as described for the Kevlar® pull test, the jacket was striped off about four inches from the plug, exposing the Kevlar® and GGP fiber. The GGP fiber was wrapped around the 6.25 cm mandrel and clamped in place. They were pulled at a rate of 1.25 cm per minute until failure.

Next, the Kevlar® was wrapped around the 6.25 cm mandrel and pulled at the same rate until failure.

All pull test were accurate to 0.1 pound, or 2.2 kilograms.

Glossary

CPQ Camphorquinone
EDMAB Ethyl-p-dimethylaminobenzoate
DDPIPF6 diphenyliodonium hexafluorophosphate
Bis GMA Reaction product of Bis Phenol A diglycidyl ether and 2 equivalents of methacrylic acid
TEGDMA Triethyleneglycoldimethacrylate
DHEPT dihydroxyethyl paratoluidine

EXAMPLES

Example 1

Samples of optical fiber assemblies were made by stripping the outer jacket of the cable, trimming the Kevlar® fibers and inserting the optical fiber into a dual termination connector.

Before bonding the fibers were cleaned with a lint free pad which had been wetted with isopropyl alcohol, then the fibers were inserted into the fitting. Two drops of adhesive were then added to each fiber's channel in the dual termination fixture, and the connector was bonded by exposing it for 25 seconds to a 3M Model XL 3000 curing light having a 75 watt tungsten source filtered to pass blue light.

In Examples C1 and C2, the adhesives used were commercially available UV curable adhesives from Dymax Corp, Torrington Conn., as Dymax 3072 and Dymax 3095, respectively. The recommended curing light, Model 3000-EC was also purchased from Dymax Corp. The adhesive of the invention has the following composition (Example 1).

| INGREDIENT | PERCENT |
|---|---|
| HEMA w/10 ppm MEHQ | 37.08% |
| BISGMA resin | 61.79% |
| EDMAB | 0.50% |
| CPQ | 0.25% |
| DHEPT | 0.38% |

The pull force needed to remove the fiber from the connector is shown in Table 1.

TABLE 1

| Example | Kevlar ® Pull force (Newtons.) | Fiber Pull force (Newtons.) | UV cure time (sec.) |
|---|---|---|---|
| C1 | 67 | 6.6 | 40 |
| C2 | 289 | 6.6 | 30 |
| 1 | 334 | 13 | 15 |

Examples 2-X and Comparative Examples

Samples were made according to Example 1 and tested for strength of the unified structure. In Examples 2 and 3, an adhesive of the invention having a formulation as described below was used. These connectors were then bonded by exposing them to 25 seconds to a 3M Model XL 3000 curing light having a 75 watt tungsten source.

For Comparative Examples C4 and C5, commercially available adhesives were used; C6 was used as purchased, C4 was modified by the addition of the ternary photoinitiator system used in Examples 2 and 3, i.e., the CPQ, EDMAB, and DDPIPF6 in the same amounts. Example C5 included this modification, and further contained 0.1% rose bengal.

Example 2

| INGREDIENT | PARTS BY WEIGHT |
|---|---|
| Bis GMA | 50.0 |
| TEGDMA | 50.0 |
| CPQ | 0.17 |
| EDMAB | 1.00 |
| DPIPF6 | 0.60 |
| Tinuvin ® P | 1.00 |

Example 3

| INGREDIENT | PARTS BY WEIGHT |
|---|---|
| Bis GMA | 50.0 |
| TEGDMA | 50.0 |
| CPQ | 0.17 |
| Rose Bengal | 0.10 |
| EDMAB | 1.00 |
| DPIPF6 | 0.60 |
| Tinuvin ® P | 1.00 |

TABLE 2

| | UV | | Blue | | White | |
|---|---|---|---|---|---|---|
| Example | Kevlar ® Pull force (N.) | Fiber Pull force (N.) | Kevlar ® Pull force (N.) | Fiber Pull force (N.) | Kevlar ® Pull force (N.) | Fiber Pull force (N.) |
| C4 | 207.1 | 3.41 | 302.3 | 3.85 | 298.4 | 2.96 |
| C5 | 252.8 | 3.85 | 311.5 | 3.41 | 15.96 | 3.11 |
| C6 | 48.45 | 3.26 | 8.668 | 3.41 | 15.96 | 3.11 |
| 2 | 320.3 | 7.26 | 342.6 | 8 | 343.7 | N/A |
| 3 | 345.9 | 5.93 | 334.3 | 8.59 | 351.5 | 9.63 |

As can be seen, the commercially available adhesive does not produce the same type of unified structure as adhesives of the invention, even when a ternary photoinitiator and additional sensitizers are added. This is true whether ultraviolet light is used to cure the adhesives, visible light across a broad spectrum, or visible light filtered to pass only the blue area of the spectrum.

What is claimed is:

1. An optical fiber connector, comprising
   a) an optical fiber cable comprising an optical fiber, a plurality of strengthening fibers disposed about said optical fiber, and a polymeric coating layer disposed about said strengthening fibers;
   b) a holder adapted to receive said cable; and
   c) an adhesive disposed within said holder, said adhesive being adapted to bond said optical fiber, said strengthening fibers and said holder into a unified structure through exposure to visible light.

2. The optical fiber connector of claim 1, wherein said cable is disposed within said holder.

3. The optical fiber connector of claim 2, wherein a portion of said cable disposed within said holder is stripped in a layerwise manner such that the stripped portion of the cable comprises an exposed terminal portion of optical fiber, succeeded by an exposed portion of strengthening fibers, succeeded by a portion of coating layer.

4. The optical fiber connector of claim 1, wherein said adhesive is curable by radiation having a wavelength between about 500 and about 600 nanometers.

5. The optical fiber connector of claim 1, wherein said adhesive is adapted to bond said optical fiber, said strengthening fibers and said holder into a unified structure through exposure to visible light for a period of time of less than 30 seconds.

6. The optical fiber of claim 5, wherein said adhesive is adapted to bond said optical fiber, said strengthening fibers and said holder into a unified structure through exposure to visible light for a period of time within the range of about 5 seconds to about 30 seconds.

7. The optical fiber connector of claim 1, wherein said unified structure consists essentially of said optical fiber, said strengthening fibers and said holder.

8. The optical fiber connector of claim 1 comprising a plurality of fiber optic cables.

9. The optical fiber connector of claim 1, wherein said optical cable is a multifiber ribbon.

10. An optical fiber connector, comprising
 a) an optical fiber cable comprising an optical fiber, a plurality of strengthening fibers disposed about said optical fiber, and a polymeric coating layer disposed about said strengthening fibers;
 b) a holder adapted to receive said cable; and
 c) an adhesive composition disposed within said holder, said adhesive being adapted to bond said optical fiber, said strengthening fibers and said holder into a unified structure through exposure to visible light;
wherein said adhesive comprises at least one acrylate monomer.

11. The optical fiber connector of claim 10, wherein said adhesive composition contains at least one monomer selected from the group consisting of hydroxypropyl methacrylate, hydroxyethyl methacrylate, and methacrylic acid.

12. The optical fiber connector of claim 10, wherein said optical fiber, said strengthening fibers and said holder are bonded into said unified structure by means of exposure to visible light for a period of up to about 30 seconds.

13. The optical fiber of claim 10, wherein said adhesive is adapted to bond said optical fiber, said strengthening fibers and said holder into a unified structure through exposure to visible light for a period of time within the range of about 5 seconds to about 30 seconds.

14. The optical fiber connector of claim 10, wherein said adhesive is curable by radiation having a wavelength between about 500 and about 600 nanometers.

15. The optical fiber connector of claim 10, wherein said unified structure consists essentially of said optical fiber, said strengthening fibers and said holder.

16. The optical fiber connector of claim 10, comprising a plurality of fiber optic cables.

17. The optical fiber connector of claim 10, wherein said optical cable is a multifiber ribbon.

18. The optical fiber connector of claim 10, wherein said adhesive comprises a photoinitiator system comprising an electron donor and a sensitizer.

19. The optical fiber connector of claim 18, wherein said photoinitiator system comprises a fluorone.

20. The optical fiber connector of claim 18, wherein said photoinitiator system comprises a diaryliodonium salt.

21. An optical fiber connector, comprising
 a) an optical fiber cable comprising an optical fiber, a plurality of strengthening fibers disposed about said optical fiber, and a polymeric coating layer disposed about said strengthening fibers;
 b) a holder adapted to receive said cable; and
 c) an adhesive disposed within said holder, said adhesive being adapted to bond said optical fiber, said strength-
 ening fibers and said holder into a unified structure through exposure to visible light;
wherein said adhesive comprises a photoinitiator system comprising an electron donor and a sensitizer.

22. The optical fiber connector of claim 21, wherein said photoinitiator system comprises a fluorone.

23. The optical fiber connector of claim 21, wherein said photoinitiator system comprises a diaryliodonium salt.

24. The optical fiber connector of claim 21, wherein said optical fiber, said strengthening fibers and said holder are bonded into said unified structure by means of exposure to visible light for a period of up to about 30 seconds.

25. The optical fiber of claim 21, wherein said adhesive is adapted to bond said optical fiber, said strengthening fibers and said holder into a unified structure through exposure to visible light for a period of time within the range of about 5 seconds to about 30 seconds.

26. The optical fiber connector of claim 21, wherein said adhesive is curable by radiation having a wavelength between about 500 and about 600 nanometers.

27. The optical fiber connector of claim 21, wherein said unified structure consists essentially of said optical fiber, said strengthening fibers and said holder.

28. The optical fiber connector of claim 21, comprising a plurality of fiber optic cables.

29. The optical fiber connector of claim 21, wherein said optical cable is a multifiber ribbon.

30. The optical fiber connector of claim 21, comprising a plurality of fiber optic cables.

31. The optical fiber connector of claim 21, wherein said adhesive comprises at least one acrylate monomer.

32. Toe optical fiber connector of claim 31, wherein said adhesive composition contains at least one monomer selected from the group consisting of hydroxypropyl methacrylate, hydroxyethyl methacrylate (HEMA), and methacrylic acid.

33. An optical fiber connector, comprising
 a) an optical fiber cable comprising an optical fiber, a plurality of strengthening fibers disposed about said optical fiber, and a polymeric coating layer disposed about said strengthening fibers;
 b) a holder adapted to receive said cable; and
 c) an adhesive disposed within said holder, said adhesive being adapted to bond said optical fiber, said strengthening fibers and said holder into a unified structure through exposure to near-infrared light.

34. The optical fiber connector of claim 33, wherein said cable is disposed within said holder.

35. The optical fiber connector of claim 33, wherein a portion of said cable disposed within said holder is stripped in a layerwise manner such that the stripped portion of the cable comprises an exposed terminal portion of optical fiber, succeeded by an exposed portion of strengthening fibers, succeeded by a portion of coating layer.

36. The optical fiber connector of claim 33, wherein said adhesive is curable by radiation having a wavelength between about 700 and about 1000 nanometers.

37. The optical fiber connector of claim 33, wherein said adhesive is adapted to bond said optical fiber, said strengthening fibers and said holder into a unified structure through exposure to near-infrared light for a period of time of less than 30 seconds.

38. The optical fiber of claim 33, wherein said adhesive is adapted to bond said optical fiber, said strengthening fibers and said holder into a unified structure through exposure to near-infrared light for a period of time within the range of about 5 seconds to about 30 seconds.

39. The optical fiber connector of claim 33, wherein said unified structure consists essentially of said optical fiber, said strengthening fibers and said holder.

40. The optical fiber connector of claim 33, comprising a plurality of fiber optic cables.

41. The optical fiber connector of claim 33, wherein said optical cable is a multifiber ribbon.

42. The optical fiber connector of claim 33, wherein said adhesive comprises at least one acrylate monomer.

43. The optical fiber connector of claim 42, wherein said adhesive composition contains at least one monomer selected from the group consisting of hydroxypropyl methacrylate, hydroxyethyl methacrylate, and methacrylic acid.

44. The optical fiber connector of claim 33, wherein said adhesive comprises a photoinitiator system comprising an electron donor and a sensitizer.

45. The optical fiber connector of claim 44, wherein said photoinitiator system comprises a fluorone.

46. The optical fiber connector of claim 44, wherein said photoinitiator system comprises a diaryliodonium salt.

* * * * *